April 22, 1952 H. DAHL ET AL 2,593,993
METAL FOIL PERFORATOR FOR CAPACITOR WINDING MACHINES
Filed July 8, 1948 4 Sheets-Sheet 1
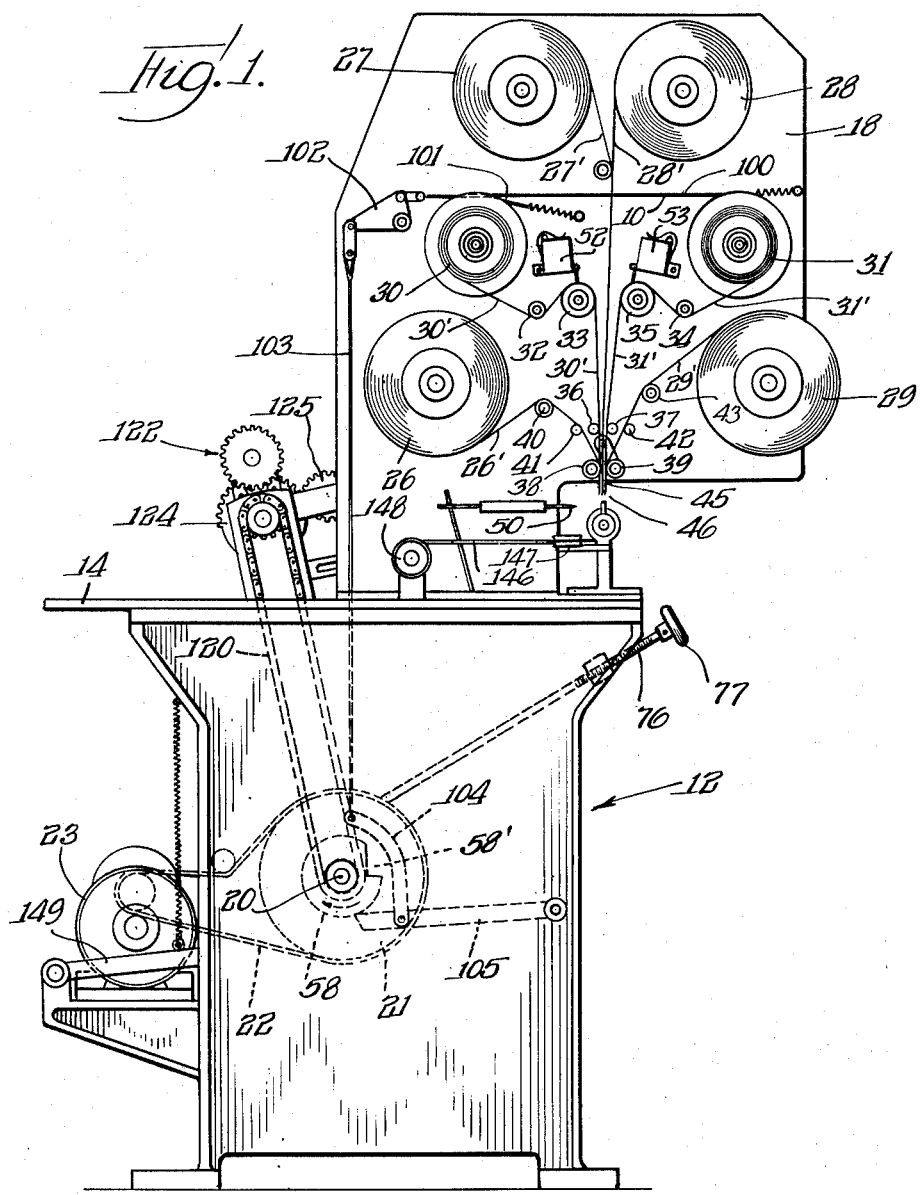
INVENTORS.
Harry Dahl and
Stephen T. Moreland

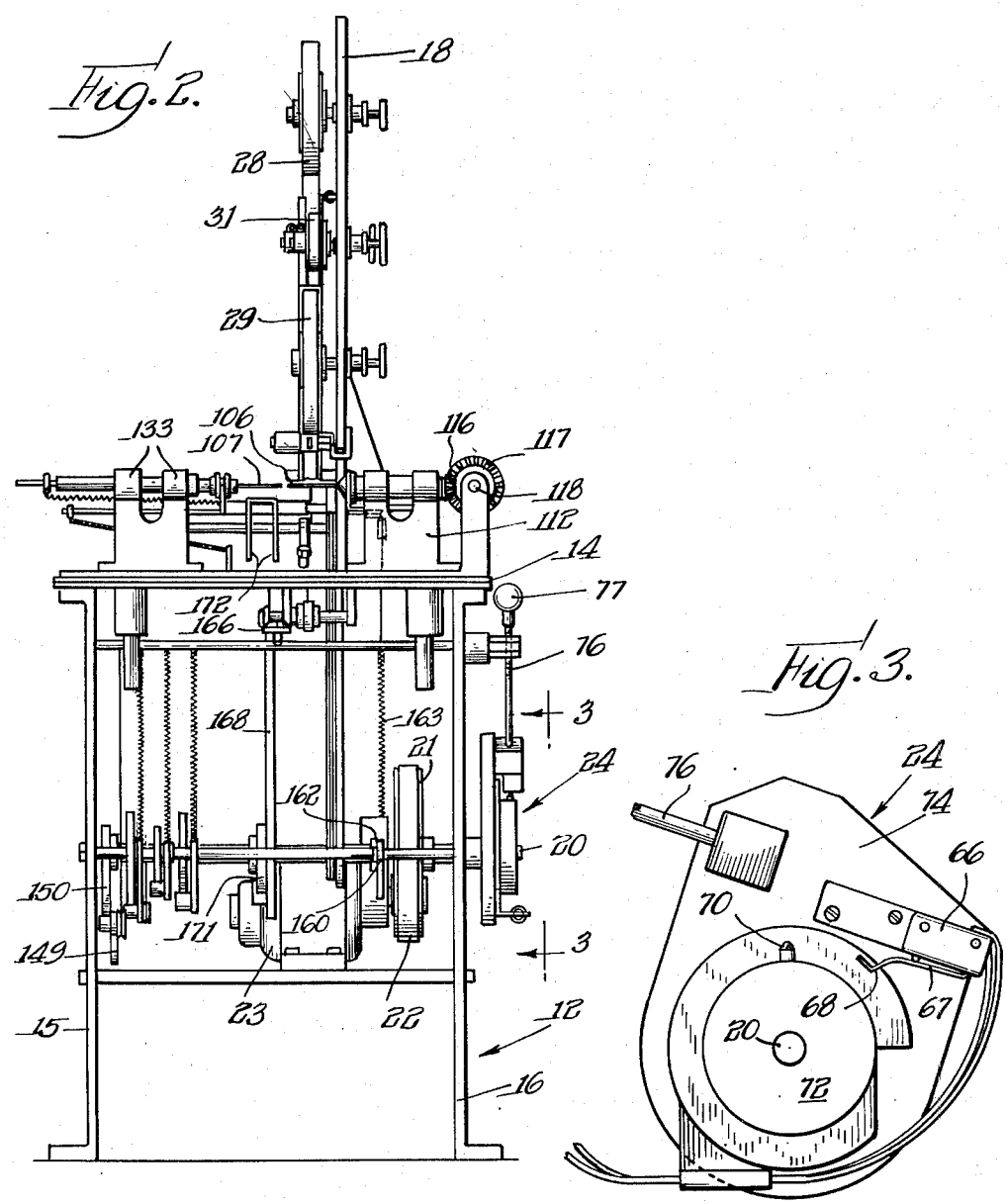

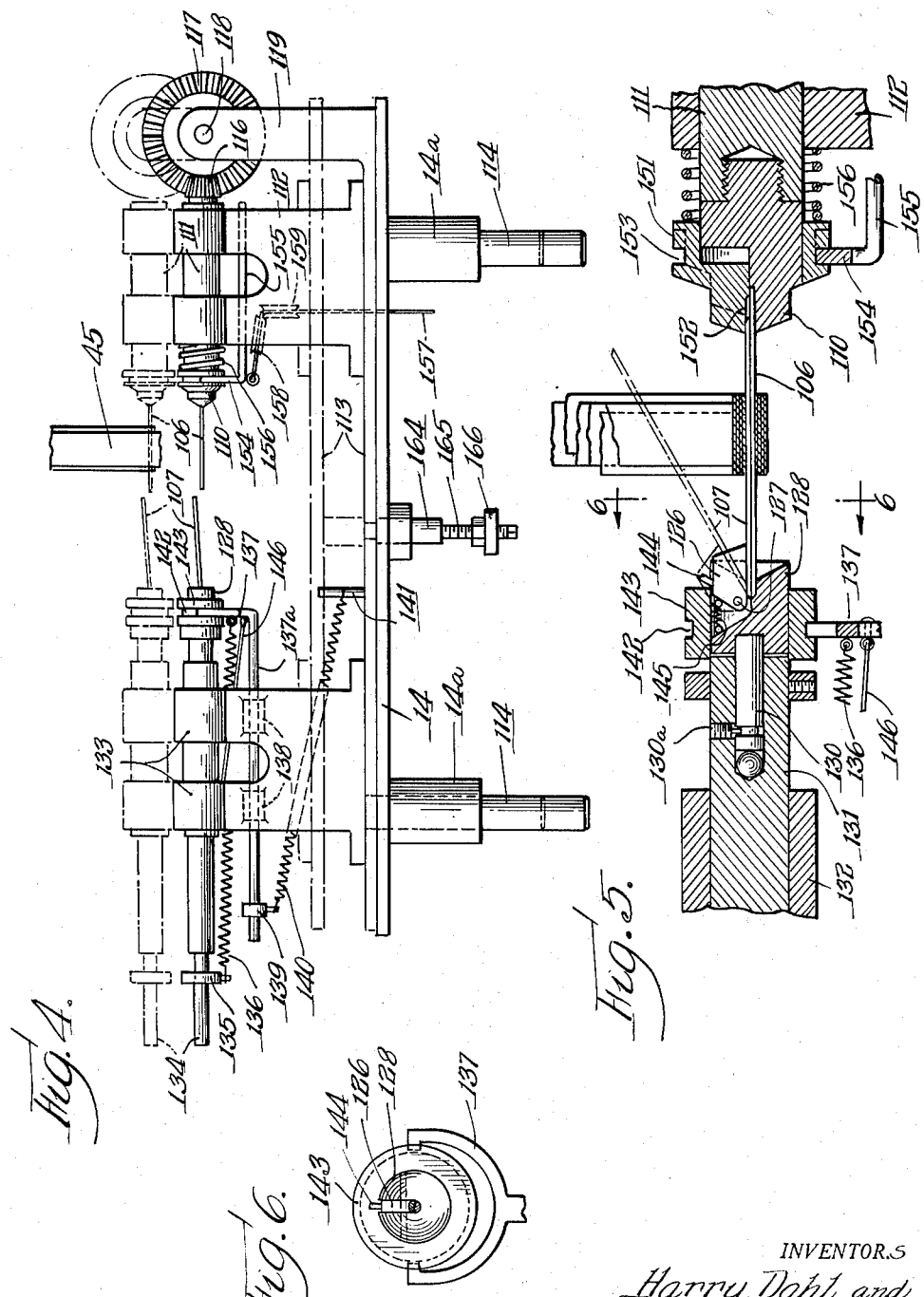

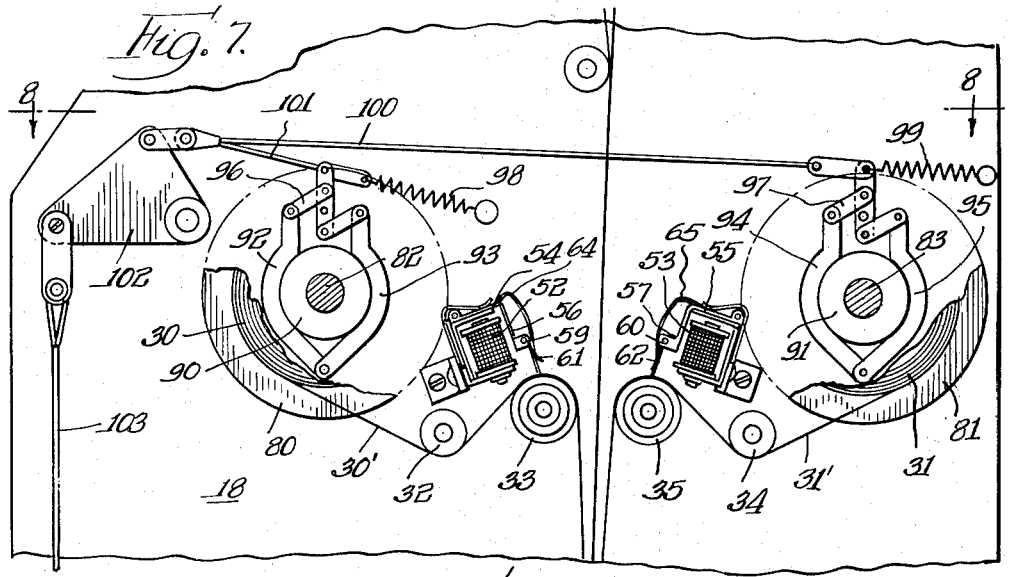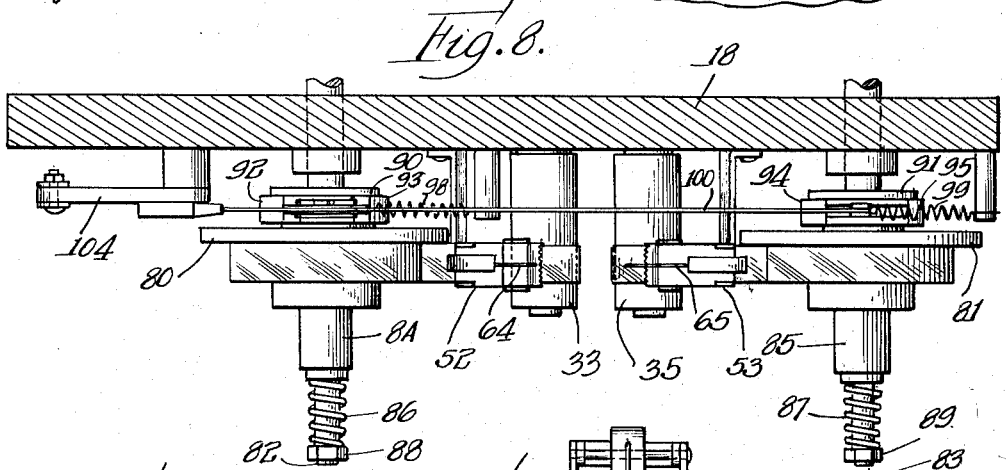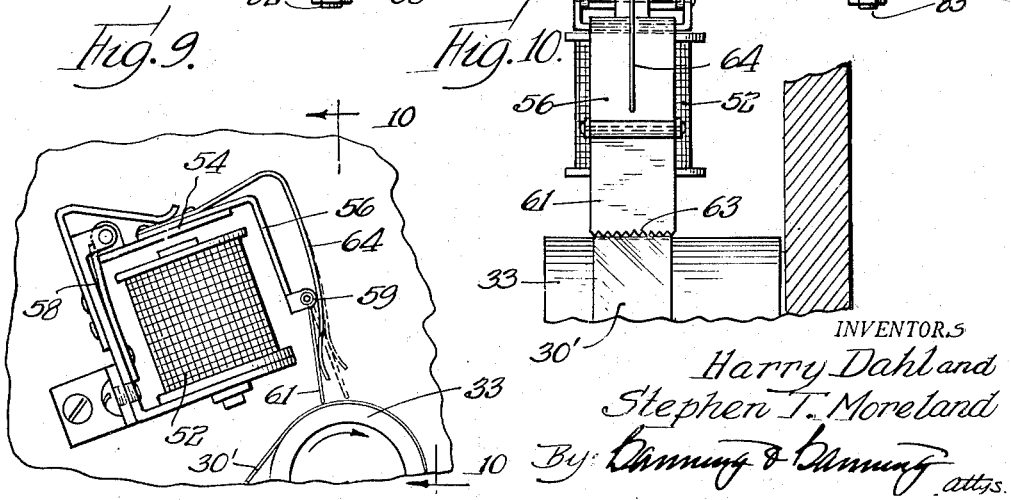

Patented Apr. 22, 1952

2,593,993

UNITED STATES PATENT OFFICE 2,593,993

METAL FOIL PERFORATOR FOR CAPACITOR WINDING MACHINES

Harry Dahl and Stephen T. Moreland, Indianapolis, Ind., assignors, by mesne assignments, to John E. Fast & Co., Chicago, Ill., a corporation of Illinois Application July 8, 1948, Serial No. 37,687

1 Claim. (Cl. 164—89)

This invention relates to the manufacture of wound electrostatic capacitors, and has to do with an improved method and apparatus for perforating the strips of metal foil forming the plates of such capacitors, prior and preparatory to severance thereof from the supply rolls, and as an incident to the winding operation.

A wound electrostatic capacitor comprises a roll made of two or more superposed elongate ribbon-like strips or webs of metal foil, constituting the plates of the capacitor, interleaved with elongate ribbon-like strips or webs of paper or other equivalent thin flexible dielectric sheet material, the strips of foil being separated and insulated from each other by one or more layers of papers.

For electrical reasons it is necessary that the strips of paper be longer than the strips of foil and that they overlap the foil strips at both ends; and that requirement introduces a manufacturing problem which would not otherwise obtain, and the successful solution of this problem is the objective of the present invention.

Wound paper capacitors, such as are here dealt with, are required in the electrical arts, especially radio and television, in large quantities; and in order to produce them economically they must be wound on machines which are, as nearly as practicable, fully automatic and adapted to run at high speeds. And, manifestly, any avoidable stopping of the machines spells loss of production and increased production cost. Therefore, in the interest of manufacturing economy it is essential that the strips of metal foil be severed without stopping or slowing down the machines—an operation which inherently must occur prior to the severing of the paper strips in order that the latter may overlap the foils endwise. To accomplish that end it has heretofore been known to perforate the metal foils along transverse lines at the points of severance by means of high voltage electric sparks and thereafter, at the proper instants, to abruptly brake the foil supply reels and thus apply tension to the foils, thereby completing the foil-severing operations along the lines of perforation, an example of such a construction being the apparatus disclosed in the Kile and Kain Patent No. 2,205,171, granted June 18, 1940. The method and apparatus of the present invention are just as satisfactory, if not more so, and are considerably more simple and less costly while entailing less possibility of getting out of order and thus impeding production.

The apparatus herein to be disclosed is characterized by the employment of serrated perforating knives, or equivalent means, which are brought into contact with the rapidly moving foil strips to perforate the same along transverse lines of severance, and which move with the foils until retracted out of engagement therewith. Since there is no relative movement between the strips of foil and the perforating knives while the latter are in contact with the foils, the perforating is accomplished as cleanly as if the foils were motionless. Preferably, the foils are run over rubber-covered guide rolls which function as resilient moving anvils for the perforating knives, and the latter preferably are of small mass and, therefore, offer little inertia to movement with the foils.

In the accompanying drawings there is shown, by way of example, a capacitor winding machine embodying the improvements herein to be explained. In its general aspects the machine illustrated is approximately identical with that which is shown and described in Patent No. 2,205,171, above referred to.

In the drawings:

Figure 1 is an elevational view of an entire capacitor winding machine having incorporated therein the features of improvement which constitute our present invention;

Fig. 2 is an elevational view of the same machine as seen from the right hand side of Fig. 1;

Fig. 3 is an enlarged detail in elevation, taken at line 3—3 of Fig. 2, showing particularly the cam-operated switch for energizing the electromagnets of the foil-perforating knives;

Fig. 4 is an enlarged elevational view of the winding mechanism, including the mandrel on which the capacitors are wound;

Fig. 5 is an enlarged section, taken lengthwise along the axis of the spindles of the winding mechanism;

Fig. 6 is a detail view taken at line 6—6 of Fig. 5;

Fig. 7 is a fragmentary enlarged elevational view of the portion of Fig. 1 which includes the perforating knives and their electromagnets, showing details of the brake mechanisms whereby the movement of the foils is momentarily stopped to effect severance thereof shortly after completion of the perforating operation;

Fig. 8 is a plan view, partly in section, taken at line 8—8 of Fig. 7;

Fig. 9 is an enlarged detail of one of the perforating knives and its actuating electromagnet; and Fig. 10 is a similar view, taken at line 10—10 of Fig. 9.

The winding machine illustrated comprises a table 12 including a table top 14 supported on a pair of horizontally spaced legs or uprights 15, 16, and also includes an upstanding frame or panel 18 attached to and supported on the table top 14.

A countershaft 20 is bridged between and journaled on the two uprights 15, 16 and carries a pulley 21 by means of which it is connected through the medium of a driving belt 22 to an electric motor 23. Said countershaft also carries a number of cams which perform certain functions later to be described, and a rotary switch-operating mechanism 24, the purpose of which is to close a circuit for energizing the electromagnets of the foil perforating knives at precisely the right instants.

The machine illustrated is designed and set up to produce capacitors each comprising two strips or webs of metal foil separated by two thicknesses of paper and disposed between two outer strips or webs of paper. The actual machines are so designed and constructed that they may be used to produce capacitors comprising several additional strips of paper; but it is not essential to a complete and adequate disclosure of the invention to complicate the drawing by inclusion of additional paper reels.

Both the paper and the metal foil are supplied in the form of rolls—the rolls of paper being identified in the drawings by reference numerals 26—29, inclusive, while the rolls of metal foil are identified by reference numerals 30 and 31. Each roll, whether paper or foil, is supported on a rotatable reel or drum which, in turn, is mounted on a stud secured to the panel 18.

Two strands of metal foil 30' and 31' are fed from the rolls 30 and 31, respectively (Fig. 1), and these are guided by guide rolls 32, 33, and 34, 35 respectively, to a position at which they turn downwardly to pass between lower guide rolls 36, 37 from which they pass further downwardly and between a fixedly mounted roller 38 and a yieldably mounted roller 39. The two inside strands of paper 27' and 28', fed respectively from rolls 27 and 28, pass downwardly, in face-to-face relation, between the two strands of metal foil 30' and 31' and the guide rolls 36, 37 and the rollers 38, 39. The outer strands of paper 26' and 29' are fed from rolls 26 and 29, respectively, and guided by guide rolls 40, 41 and 42, 43 into the bight of rollers 38, 39, along with the two inner strands of paper 27' and 28' and the two strands of metal foil 30' and 31'. In Fig. 1 the lower end portions of the several strands of paper and metal foil, designated collectively as 45, are shown terminated at a short distance below the rollers 38, 39 at the point 46, this being the condition obtaining immediately following the completion of a capacitor winding operation and, of course, immediately prior to the commencement of the next winding operation.

The winding of a capacitor is accomplished by means of a two-part mandrel which, at the proper time, moves up and grips the several strands 45 of paper and foil depending from rollers 38, 39 (Fig. 1), and then rotates, while at the same time moving downwardly to its normal position. This, of course, causes the several strands of paper and foil to be paid out from their respective rolls.

Following a predetermined number of revolutions, depending upon the size of capacitor being made, the mandrel stops rotating and a knife 50 is actuated automatically to sever the several strands of paper, the foil having already been severed, as will presently be explained, before the knife 50 is actuated.

As stated at the outset, the strands of paper of each capacitor are longer than the strands of metal foil, and they overlap the foils endwise at both ends. This means that the foils have to be severed prior to severance of the paper by the knife 50, and that after severance of the foils the strands 30', 31' must be momentarily restrained against further travel with the paper strands in order to produce a suitable end-to-end spacing between the severed ends of the foils. The severance of the paper strands effected by the knife 50 occurs midway between the adjacent severed ends of the foils.

Our invention pertains primarily to the severance of the foils, each of which must be perforated at transverse lines of cleavage corresponding with the two ends of each foil of each capacitor; and it has to do specifically with the improved arrangement and method of perforating the foils as will now be described.

Referring more especially to Figs. 7–10, inclusive, the guide rolls 33 and 35 preferably are rubber covered; and mounted adjacent to each is an electromagnet 52, 53, each having an armature 54, 55 to which is affixed an L-shaped plate 56, 57. To the lower end of each L-shaped plate 56, 57 there is pivotally connected at 59, 60 a perforating knife 61, 62, the lower edge of which is serrated, as best shown at 63 in Fig. 10, and sharpened so as to perforate the strip of metal foil passing over the guide roll 33, 35 when the electromagnet is energized. A single operation of the perforating knife simultaneously perforates the metal foil at a plurality of closely spaced points extending entirely across the metal foil. Normally, the armatures 54, 55 are retracted by suitable springs 58 (Fig. 9) to maintain the serrated perforating edges of the knives 61, 62 out of contact with the foils; but, upon energization of the two electromagnets, the two perforating knives are moved for a brief instant into contact with the two foils, the rubber coverings of the guide rolls 33, 35 acting as yieldable anvils to receive the blows of the knives whereby their teeth are permitted to penetrate the foil so as to produce clean cuts, while at the same time not dulling or blunting the sharpened knife teeth. Wire springs 64, 65 are anchored respectively to the armatures 54, 55 and bear at their distal ends against the knives 61, 62, thereby yieldably holding the knives in their normal postures as per the full line showing of Fig. 9. When the perforating knives strike the moving strips of foil, their serrated edges are carried along with the foil to a position such as that indicated in dotted outline in Fig. 9, the knives being rotated, as a result, about their fulcrums 59, 60; but the duration of each energization of electromagnets 52, 53 is so brief that before the serrated edges can be carried any considerable distance by the foils the knives are retracted. The knives are of small mass and the springs 64 are light so that there is extremely little resistance to the movement of the serrated edges of the knives with the foils; also there is no apparent tendency to tear the foils.

The windings of the two electromagnets 52, 53 are included in a common energizing circuit, in which is also included a normally open switch 66 (Fig. 3) having an operating lever 67, bent to provide a cam surface 68 which lies in the path of a lug 70 carried by a disc 72 which is secured to the countershaft 20. The disc 72 can be rotatively adjusted on the countershaft 20 so as to change the timing of the switch 66; and the latter is carried by a plate 74 which is rotatably adjustable, thus providing for fine adjustments of the time of energization of the electromagnets 52, 53. Adjustments of the plate 74 are effected by means of an adjusting screw 76 provided with a hand wheel 77 (Fig. 1).

When the lines of severance in the two foils, formed by the perforations, have traveled downwardly from the guide rolls 33, 35 to a suitable position adjacent the rollers 38, 39, brakes are applied for an instant to the reels which carry the rolls 30 and 31 of metal foil, and the resultant added tension severs the two strips of foil at the perforated lines of severance. The brakes are kept on just long enough to permit the severed ends of the foil to separate to whatever extent may have been determined upon, and then the cutting-off knife 50 is actuated to sever the four strips of paper along a line midway between the severed ends of the foils. The brakes are then released to permit the two strips of foil to be carried along with the paper strips.

The reels for the two rolls of metal foil and the brake mechanism therefor are shown in detail in Figs. 7 and 8. The reels are identified by the reference numerals 80, 81, and rotatably mounted on studs 82, 83, which are detachably secured to the panel 18. The rolls 30 and 31 of metal foil are held in place on their reels by means of flanged sleeves 84, 85 which are pressed endwise against the rolls of foil by coil springs 86, 87, held in place by nuts 88, 89. Each reel 80, 81 has an integral brake drum 90, 91, each arranged to be acted upon by a pair of brake arms 92, 93 and 94, 95, which are adapted to be contracted into engagement with the respective brake drums by the linkages 96, 97, the operation of which is self-evident from Fig. 7. Springs 98, 99 serve to actuate the brakes. The two linkages 96, 97 are connected by means of cables 100, 101 to a bellcrank 102, to which also is connected a cable 103 which normally is maintained under tension in opposition to the springs 98, 99, to thus hold the brakes inactive. The lower end of the cable 103 is connected to a rigid curved arm 104, the lower end of which is rigidly connected to a lever 105, Fig. 1, which bears against the periphery of a cam disc 58 locked to the countershaft 20 and having a notch 58' which allows the coacting lever 105 to move upwardly for a brief instant during each revolution of the shaft 20. This releases the tension on the cable 103, and consequently allows the brakes to be applied by the springs 98, 99.

The mandrel upon which the capacitors are wound is shown in detail in Figs. 4 and 5 and consists of a rigid mandrel section 106 and a movable mandrel section 107. These mandrel sections are raised and lowered, as shown in the full and dotted line positions of Fig. 4. The mandrel section 107 is movable from the open or dotted line position of Fig. 5 to the closed position indicated by full lines therein. When the mandrel comes to rest in the full line position of Fig. 4, the fixed mandrel section 106 lies at the rear of the depending multiple strand 45, while the movable mandrel section lies on the opposite side. By raising the mandrel sections bodily from the full line position of Fig. 4 to the dotted line position, and then by closing the movable section 107, the two sections are caused to grip the depending multiple strand 45 between them. The method of raising and lowering the mandrel sections will later be described.

The fixed mandrel section 106 is carried by a fixed mandrel head 110 which is secured to a shaft 111 journaled in a suitable bearing housing 112 that is carried on a platform 113. This platform is movable up and down as will later be explained, and as shown in full and dotted lines in Fig. 4. In these movements the platform is guided on rods 114 slidably fitted in guides 14a on the table top 14. The method of raising this platform will later be explained, and also the means for gripping the outer end of the mandrel section 107.

The shaft 111 is secured against endwise movement and has a bevel pinion 116 meshing with a bevel gear 117. The latter is keyed to a shaft 118 which is journaled in suitable bearings 119. The shaft 118 is driven from the countershaft 20 through a drive chain 120 and a variable speed transmission 122 (Fig. 1) which includes an interrupted gear 124. Thus it will be seen that with the countershaft 20 running at a constant speed, the mandrel shaft 111 will be driven at a reduced speed part of the time and at an accelerated speed part of the time. The proportion of the total time during which the mandrel will remain stationary depends upon the design of the interrupted gear 124. Likewise, the number of turns that the mandrel shaft 111 will make per revolution of the countershaft 20 depends upon the gears making up the gear train, but is fixed by each gear train. The Geneva gear train comprising the interrupted gear 124 insures that the mandrel 106 will stop at the same position each time.

The movable mandrel section 107 (Figs. 4 and 5) is secured to a block 126 which is pivotally mounted by a pin 127 on a mandrel head 128, the latter being carried by a stub shaft 130 which is journaled in a shaft 131, rotatably and slidably journaled in a sleeve 132 that is carried by a support 133 on the platform 113. A rod 134 forms a reduced section of the shaft 131 and has adjustably mounted thereon a collar 135 to which is secured one end of a tension spring 136, the opposite end being connected to a yoke 137 which has a straight portion 137a slidably mounted in suitable bearings 138, and has a block 139 adjustably mounted on its opposite end. A tension spring 140 is connected at one end to the block 139 and at the other to a pin 141 on the platform 113. The yoke 137 is bifurcated and engages an annular groove 142 in a sleeve 143, the latter being slidable over the shaft 131 and the mandrel head 128. The sleeve 143 bears against a pin 144 in the block 126. A tension spring 145 holds the pin 144 against the sleeve.

The spring 140 tends to hold the various parts in the full line position of Fig. 5 in which the mandrel sections are in overlapping relation and are locked together as will hereinafter be explained. A flexible member 146 (Fig. 1) is connected to the yoke 137 and passes over suitable sheaves 147, 148 and over another sheave (not shown) on a lever 149 which is adapted to be actuated by a cam 150 (Fig. 2) on the countershaft 20. The spring 140 tends to hold the parts shown in Fig. 4 against the tension of the flexible member 146 so as to maintain the latter taut at all times. As the cam 150 rotates it acts through the flexible member 146 to draw the mandrel section 107 from the position shown in Fig. 5 to the position shown in Fig. 4, and as the cam continues to rotate the spring 140 returns it to the position of Fig. 5.

The mandrel head 128 is adapted to receive the end of the mandrel section 106 as it is moved to the right in Fig. 5, while the section 107 is still in the open or dotted line position, due to the fact that the spring 136 has forced the shaft 131 and the mandrel section 107 to the full line position of Fig. 5; but the flexible member 146 acts to hold the sleeve 143 in the dotted line position of Fig. 5 until, with advance of the cam 150, the flexible member 146 permits the spring 140 to return the sleeve 143 to the full line position of Fig. 5, thereby moving the mandrel section 107 into the full line position of Fig. 5, and at the same time gripping the outer end of the mandrel section 106.

At the same time, the shaft 111 which carries the mandrel head 110 and the mandrel section 106 also carries a sliding mandrel head 151 which is slidably mounted on the mandrel head 110 and has a recess 152 adapted to overlie and engage the outer end of the mandrel section 107 in the full line position of Fig. 5 when the sliding mandrel head 151 is forced to the left as there shown. This movement takes place after the two mandrel sections are closed. The sliding mandrel head 151 has an annular groove 153 therein in which is slidably mounted a yoke 154 having a rod 155 which is slidably mounted in the bearing housing 112 and parallel to the shaft 111. A spring 156 between the housing and the sliding mandrel head normally forces the latter outwardly to the position shown in Figs. 4 and 5.

A flexible member 157 is secured at one end to the yoke 154 and passes over suitable sheaves 158, 159 (Fig. 4) and is connected to a lever 160 (Fig. 2) which is pivotally connected to the table supports. The lever 160 is held in contact with a cam 162 (Fig. 2) on the countershaft 20 by means of a tension spring 163. Thus, at a predetermined point in the rotation of the countershaft 20, the cam 162 draws the sliding mandrel head 151 back against the action of the spring 156 and holds it there until the lever 160 suddenly drops off the point of the cam, thereby releasing the head 151 which is then returned by the spring 156 to the full line position of Fig. 5, thereby locking the end of the mandrel section 107 which has just closed to the full line position of Fig. 5. It is open just long enough to allow the mandrel section 107 to close and then be engaged.

For raising the platform 113 from the full line position to the dotted line position of Fig. 4, the platform is provided with a centrally located pin 164 which passes through the table 14 and is adapted to be engaged by a screw 165 adjustably carried by a lever 166, which is fulcrumed to the table 14, the opposite end being pivotally connected to a link 168. The shaft 20 passes through a slotted opening in the link 168 so that the link is guided thereby. The link carries a cam follower which rides on a cam 171 which is locked to the shaft 20. Thus, the platform 113 remains in the full line position for more than half each revolution of the shaft, but is raised to the dotted line position for a predetermined portion of each revolution.

Starting with the parts as shown in full lines in Fig. 4, the mandrel section 106 lies back of the depending ends 45 of the paper and foil strands which go to make up the capacitor. The mandrel section 107 is retracted and open as shown in dotted lines in Figs. 4 and 5. As the shaft 20 rotates, the cam 150 permits the flexible member 146 to be drawn back, thereby forcing the shaft 131 to the right. At the same time the cam 171, acting on the link 168, lifts the platform 113 from the full line position of Fig. 4 to the position shown in dotted lines therein. In this latter position the two mandrel sections 106 and 107 lie one on each side of the lower ends of the depending strands 45. At this time the sliding mandrel head 151 (Fig. 5) is retracted, as previously described. As the yoke 137 continues to move to the right, the shaft 131 moves with it until the collar 135 strikes the sleeve 132. This fixes the movement to the right of the mandrel section 107. The mandrel head 151 then is moved by the spring 156, as previously described, to lock the mandrel section 107.

As the yoke 137 continues to move to the right, it stretches the spring 136 and moves the mandrel section 107 from the dotted line position of Fig. 5 to the full line position, thereby causing the sleeve 143 to engage the pin 144 and to close the mandrel section 107 on the mandrel section 106. The cam 162 then releases the tension on the flexible member 157, thereby permitting the spring 156 to return the sliding mandrel head 151 to the position shown in Fig. 5 in which, as previously described, it engages and locks the outer end of the mandrel section 107 to the mandrel section 106. At the same time the outer end of the mandrel section 106 is locked to the mandrel section 107 in the mandrel head 128. Following this, the mandrel shaft 111 is driven by the gear train 122. The two mandrel sections are locked together and are driven from the shaft 111, the mandrel head 128 rotating on its own stub shaft 130. This stub shaft is held in the shaft 131 by means of a dog point setscrew 130a in the shaft 131.

As the mandrel sections 106, 107 rotate, the paper and foil strips are wound about the mandrel, suitable tension being maintained on each strip by means of drag brakes applied to the respective rolls of paper and foil. As the winding continues, the cam 171 rotates so as to return the platform 113 to its lowered position. The winding then proceeds so long as the mandrel is driven by the toothed portion of the gear 124. When the winding is nearly complete, the metal foil strips are perforated, as previously described, and the brakes are thereafter applied to the brake drums 90, 91, to sever the metal foils, also as previously described; and the knife 50 is then actuated to cut the several strands of paper, thereby detaching the finished capacitor. The mandrel shaft 111 then stops, and immediately thereafter the mandrel section 107 is withdrawn from the fully wound capacitor which is retained on the mandrel section 106 by two spaced stripping fingers 172 (Fig. 2).

While the shaft 111 and the mandrel section 106 remain at rest, the fully wound capacitor is taped or glued by an operator, to prevent unwinding, and manually removed; or it may be secured and removed by automatic means, not shown.

It is obvious that various changes may be made in the specific embodiments set forth for purposes of illustration without departing from the principles of the invention. The invention is accordingly not to be limited to the precise details disclosed herein but includes all modifications thereof within the spirit and scope of the appended claim.

We claim:
In a capacitor winding machine, a mechanism for perforating a moving strip of metal foil at preselected intervals comprising a rotatably mounted guide roller carried by said machine and over which the foil is passed, said guide roller having a rubber-like covering providing a resilient backing surface for frictional contact with the foil, said roller being so disposed relative to said machine that the foil is in frictional contact with a substantial circumferential portion of the roller covering, perforating means carried by said machine in juxtaposition to said guide roller, said perforating means including a perforating tool having a perforating edge disposed transversely of and normally in substantially perpendicular relation to a plane tangential to said guide roller intermediate the ends of said circumferential portion, said perforating tool normally being out of contact with said guide roller, electromagnetic means carried at one end by said machine and with said one end in juxtaposition to said guide roller, an armature pivotally disposed adjacent the other end of said electromagnetic means and normally resiliently retained out of contact therewith, said armature being movable responsive to actuation of the electromagnetic means toward the latter means and the guide roller, and an L-shaped plate carried by said armature for movement therewith and pivotally supporting said perforating tool, actuation of said electromagnetic means effecting movement of said perforating tool toward said guide roller so that the perforating edge of the perforating tool penetrates the foil, the rubber-like covering providing a yieldable anvil backing the foil, and the perforating edge of the tool being movable with the foil and pivoted out of contact with the foil upon continued movement of the foil, deactuation of the electromagnetic means effecting retraction of the perforating tool.

HARRY DAHL.
STEPHEN T. MORELAND.

REFERENCES CITED

The following references are of record in the file of this patent:

UNITED STATES PATENTS

| Number | Name | Date |
|---|---|---|
| 652,754 | Davis | July 3, 1900 |
| 938,441 | Shelton | Oct. 26, 1909 |
| 1,931,979 | Chandler | Feb. 25, 1931 |
| 2,142,728 | Kienzle | Jan. 3, 1939 |
| 2,205,171 | Kile et al. | June 18, 1940 |
| 2,235,948 | Schwisow | Mar. 25, 1941 |
| 2,333,024 | Mathes | Oct. 26, 1943 |